United States Patent [19]
Schott et al.

[11] 3,818,318
[45] June 18, 1974

[54] APPARATUS FOR REGULATING A D.C. VOLTAGE

[76] Inventors: Heinrich Schott, Seebergerstrasse 6a, 8 Munich 71; Martin Huber, Lorenzstrasse 68, 8 Munich 83, both of Germany

[22] Filed: Feb. 22, 1973

[21] Appl. No.: 334,576

[30] Foreign Application Priority Data
Mar. 27, 1972 Germany............................ 2214930

[52] U.S. Cl...................... 323/9, 323/17, 323/20, 323/DIG. 1
[51] Int. Cl............................. G05f 1/56, G05f 1/58
[58] Field of Search.... 321/2; 323/17, 22 T, DIG. 1, 323/9, 20

[56] References Cited
UNITED STATES PATENTS

| | | | |
|---|---|---|---|
| 3,590,364 | 6/1971 | Okun | 323/DIG. 1 |
| 3,600,666 | 8/1971 | Gliever | 232/DIG. 1 |
| 3,629,686 | 12/1971 | Hendrikus et al. | 323/DIG. 1 |

FOREIGN PATENTS OR APPLICATIONS

| | | | |
|---|---|---|---|
| 1,181,350 | 2/1970 | Great Britain | 323/DIG. 1 |

*Primary Examiner*—A. D. Pellinen
*Attorney, Agent, or Firm*—Schuyler, Birch, Swindler, McKie and Beckett

[57] ABSTRACT

Apparatus for regulating a d.c. voltage appearing across a load. The emitter-collector junction of a transistor is connected in series with a retardation coil and with the load impedance to a d.c. voltage source. The voltage applied to the load impedance is compared with a reference voltage in a regulating circuit. The latter circuit provides an output signal of a value which is a function of the d.c. voltage appearing across the load impedance. The conductivity of the emitter-collector path of the aforementioned transistor is controlled by the latter output signal. An adjustable impedance is connected in series with the primary winding of a transformer and to the voltage source. The secondary winding of the transformer is connected across the base-emitter junction of the aforementioned transistor, and the signal appearing across this winding controls the operation of the transistor. A frequency generator produces a timing signal, which through the regulating circuit, produces an edge of the output signal. The other edge of the output signal is a function of the d.c. voltage appearing across the load impedance.

3 Claims, 7 Drawing Figures

3,818,318

APPARATUS FOR REGULATING A D.C. VOLTAGE

BACKGROUND OF THE INVENTION

This invention relates to apparatus for regulating d.c. voltages across a load resistor. In particular, the invention is directed to the type of voltage regulator utilizing a semiconductor junction for controlling current flow through a load.

A switch regulator of known construction is the two-step action controller, wherein a terminal of polarity one of a d.c. voltage source is connected over the emitter-collector junction of a transistor switch and through a voltage dropping resistor and a load impedance to a terminal the other polarity of the d.c. voltage source. The transistor switch is blocked if the voltage applied to the load resistor reaches its maximum value, and it is conductive if it reaches its minimum value. A great disadvantage of this prior art arrangement is the dependence of the switching frequency on the voltage difference between the limit values. A further drawback is the fact that an a.c. voltage is superimposed on the voltage applied to the load resistor, which can only be removed through filtering.

Another switch regulator is known wherein, likewise, one polarity of a d.c. voltage source is connected to the other polarity of the d.c. voltage source over the emitter-collector junction of a transistor through a retardation coil and through the load resistor. In this arrangement, the transistor switch is regulated at a constant frequency through pulse-width control. The pulse width is varied by comparing a triangular current with a current which is proportional to the voltage across the load resistor. A disadvantage of this regulator is the comparatively great technical effort required.

An object of this invention is to provide a circuit arrangement for regulating a d.c. voltage, wherein the disadvantages of the prior art circuit arrangements, discussed hereinabove, as well as others, are avoided.

SUMMARY OF THE INVENTION

The aforementioned and other objects are achieved by the invention by providing in a circuit arrangement a controllable impedance which is connected in series with the primary winding of a transformer and to an operating voltage source. The secondary winding of this transformer is connected to the base-emitter voltage of the switching transistor, a signal being provided through this secondary winding for the purpose of controlling the transistor. A frequency generator is further provided which generates a timing signal, and another signal edge is produced as a function of the d.c. voltage appearing across the load resistor.

The circuit arrangement in accordance with the invention is characterized by the fact that, by means of the transformer, during the blocking non-conductive phase of operation of the switching transistor, a defined blocking voltage is applied to the base-emitter junction of the transistor. In this way, a circuit can be realized which is insensitive to temperature. A further advantage of the circuit arrangement in accordance with this invention is the fact that it is suitable for regulating a large d.c. voltage area across the load impedance. This is ensured because of the electrical isolation interposed by the transformer. The circuit arrangement in accordance with the invention is further characterized by the fact that it can be constructed very economically through the use of an integrated voltage controller and an integrated amplifier.

BRIEF DESCRIPTION OF THE DRAWINGS

The principles of the invention will be best understood from a consideration of the following exemplary detailed description in view of the accompanying drawing wherein like reference letters and numerals denote like parts.

DETAILED DESCRIPTION OF THE DRAWING

Figure 1:
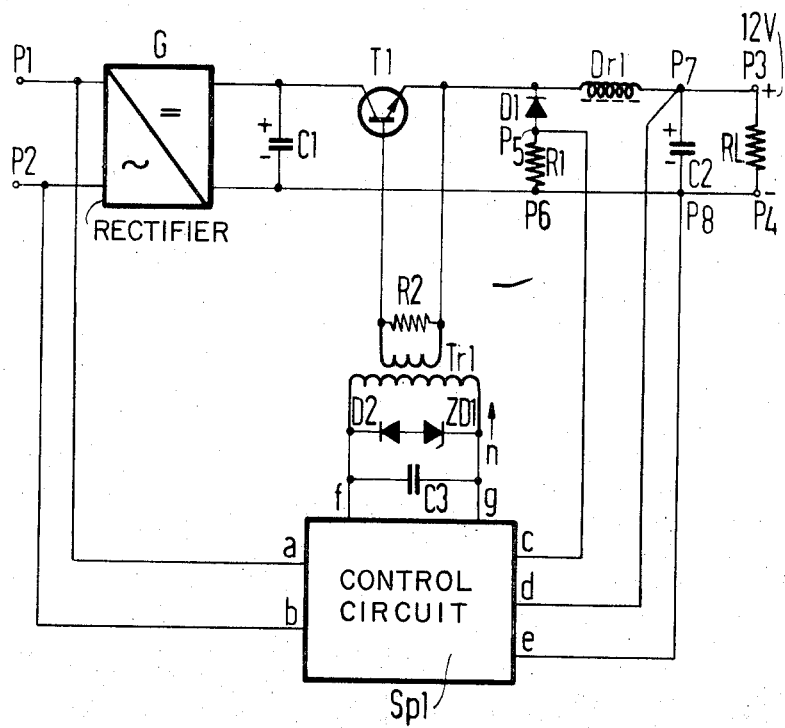
FIG. 1 is a schematic diagram of a preferred embodiment of a circuit arrangement according to the invention for regulating a d.c. voltage across a load impedance.

The apparatus in FIG. 1 serves to regulate a d.c. voltage appearing across a load impedance RL. This circuit comprises a rectifier G, capacitors C1 (5000 uF) C2, C3, transistor T1, retardation coil Dr1, diodes D1, D2, resistors R1, R2, RL, control circuit SP1, transformer Tr1 and Zener diode ZD1. These components are connected as shown in FIG. 1.

The rectifier G is connected to an a.c. voltage of 220V through the terminals P1 and P2, and the rectifiers generates a d.c. voltage of 22V in the known manner. The capacitors C1 and C2 serve as filter capacitors. Transistor T1 is operated as a transistor switch and is opened and closed by means of the control circuit S1. To achieve this purpose, a voltage is taken from the terminals P7 and P8, and is compared within the control circuit SP1 with a reference voltage. If the voltage taken at the terminals P7 and P** is greater than the reference voltage, the blocking or non-conducting time of the transistor T1 is lengthened by means of the control circuit SP1 and the transformer Tr1. If, conversely, the voltage taken at the switching terminals P7 and P8 is smaller than the reference voltage, the blocking time of the transistor T1 is shortened. Thus, the object of the circuit arrangement shown in FIG. 1 is to keep constant the voltage of, for example, +12V applied to the switching terminals P3 and P7, and it is particularly effective if comparatively small load currents up to a maximum of, for example, 1.5 Ampere flow through the load impedance RL.

Figure 2:
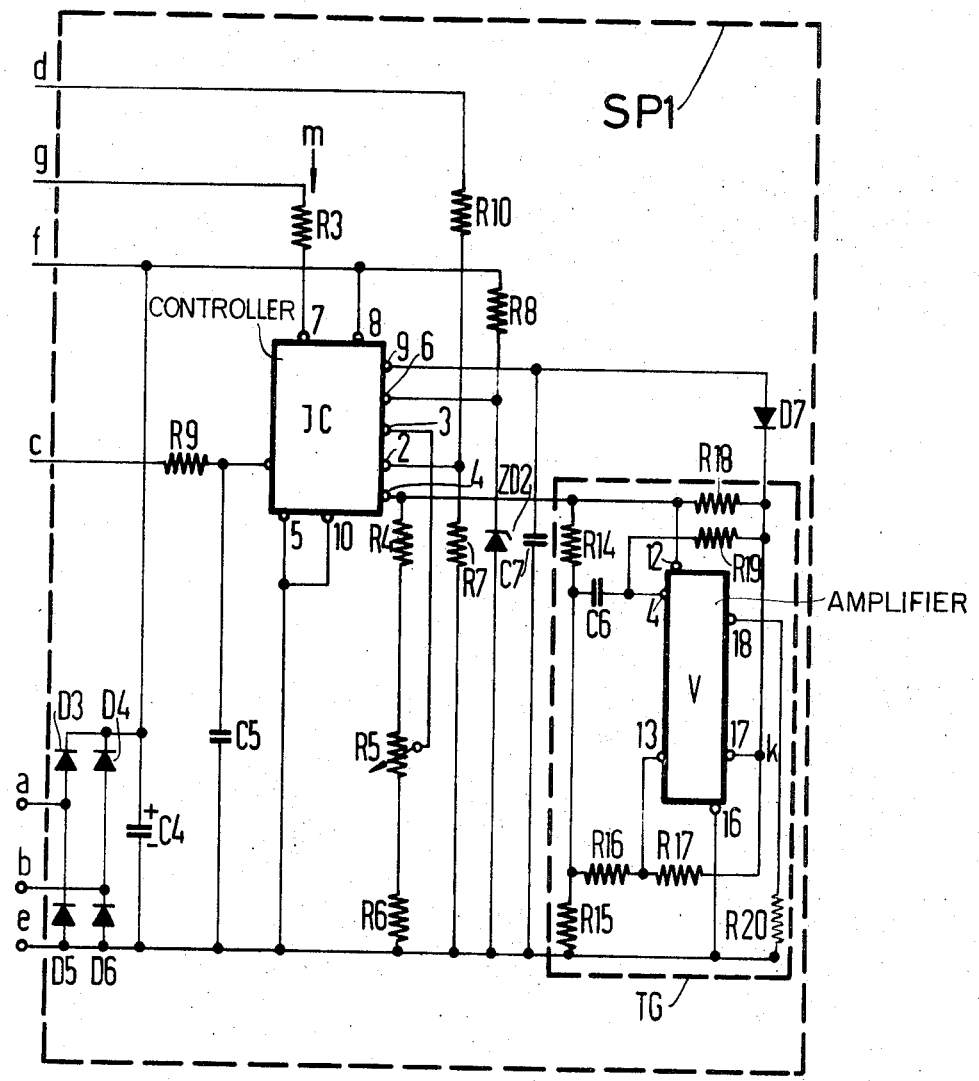
FIG. 2 is a more detailed schematic diagram of a portion of the circuit arrangement in accordance with FIG. 1.

FIG. 2 shows in greater detail the control circuit SP1, in the FIG. 1 embodiment. This control circuit comprises the integrated controller JC, integrated amplifier V, diodes D3, D4, D5, D6, D7, capacitors C4, C5, C6, C7, the resistors R3, R4, R5, R6, R7, R8, R9, R10, R14, R15, R16, R17, R18, R19, R20 and the Zener diode ZD2. These components are connected as shown in FIG. 2.

The integrated voltage controller IC is coupled to an auxiliary voltage of 24V at the terminals 8 and 5. At the terminal 4, it supplies a reference voltage for the voltage divider R4, R5, R6. A tap of the resistor R5 is connected to the terminal 3. The real value of the output voltage which is applied to the terminals P7 and P8 shown in FIG. 1 is reduced by means of the voltage divider composed of the resistors R7 and R10, and the reduced voltage is applied to the terminal 2 of the integrated controller IC. The frequency generator TG is connected to terminal 9 of the integrated controller IC through the diode D7, the frequency generator being made up of the amplifier V, capacitor C6 and resistors R14, R15, R16, R17, R18, R19, R20.

The internal connection of the terminals 6 and 7 of the integrated controller IC is a resistance which is of high impedance for about 80percent of the period of the frequency generator output and of low impedance for the remaining 20percent. The terminal 1 of the integrated controller IC is connected to the terminal P5 shown in FIG. 1. The resistor R9 and the capacitor C5 are used for filtering purposes.

Figure 3:
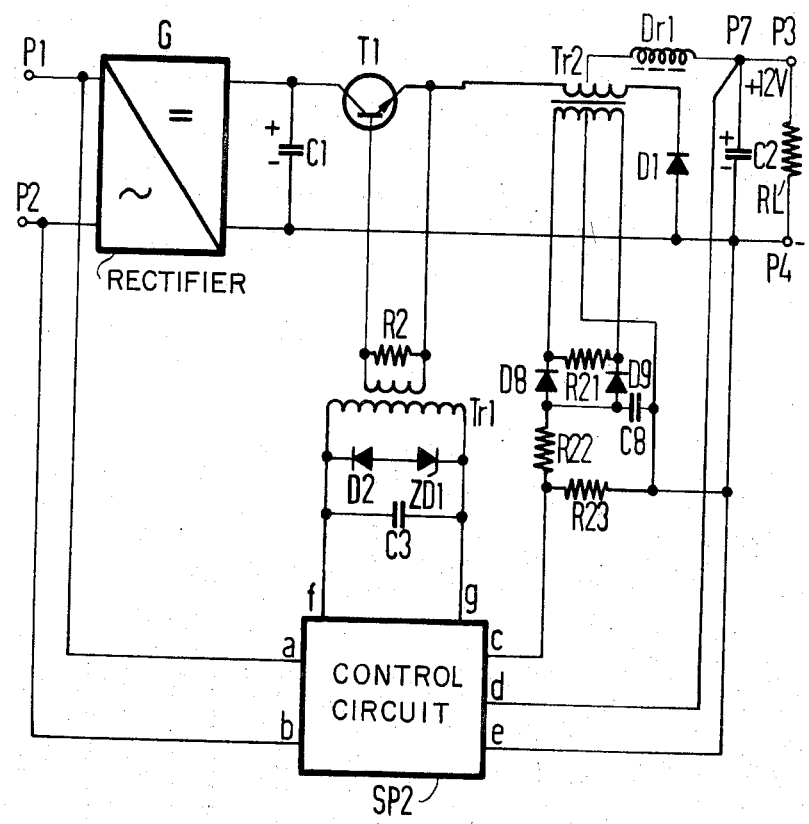
FIG. 3 is a schematic diagram of an additional preferred embodiment of a circuit arrangement for controlling a d.c. voltage across a load resistor in accordance with the invention.

The circuit arrangment in accordance with FIG. 3 is also employed as a means to control the d.c. voltage applied to the terminals P3 and P4 at the load resistor RL. In addition to the components in accordance with FIG. 1, the FIG. 3 embodiment uses a transformer T$r$2, diodes D8, D9, capacitor C8, and resistors R21, R22, R23. Instead of the control circuit SP1 in accordance with FIG. 1, a slightly differently constructed control circuit SP2 is now provided. These components are connected as shown in this figure.

Figure 7:
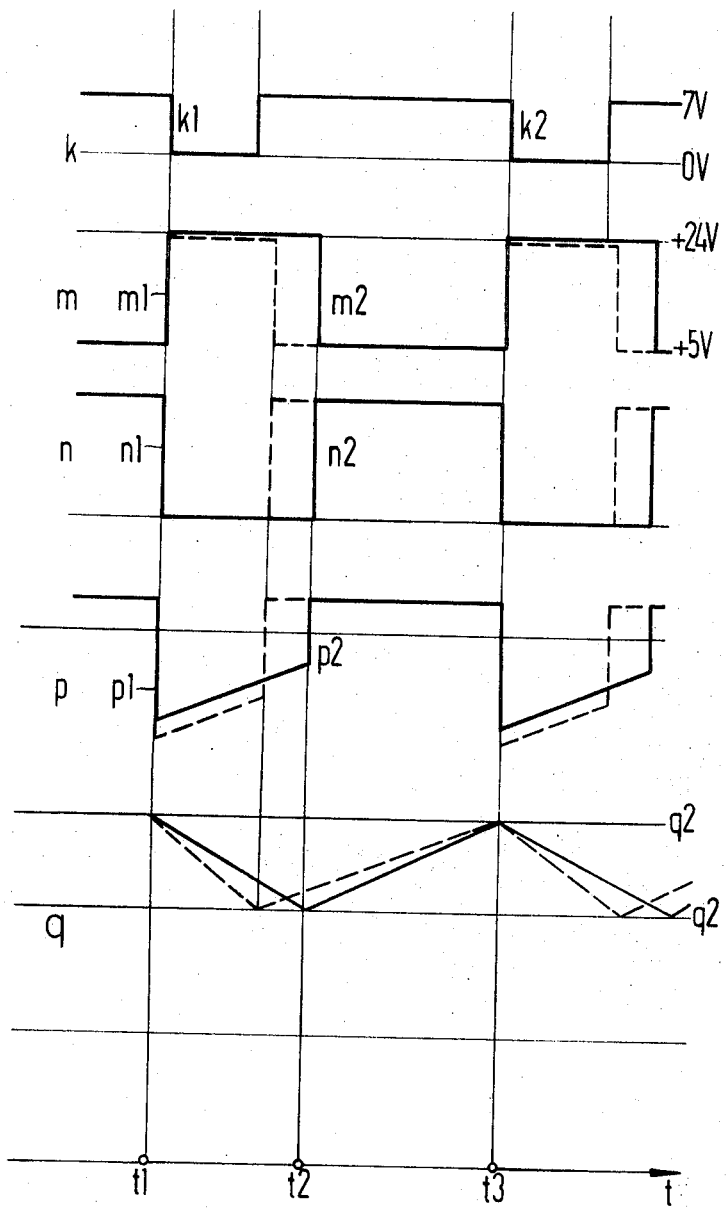

In connection with the FIG. 3 embodiment it should be noted, referring to FIG. 7, that during the blocking phase depicted in that figure, from the instant $t1$ to the instant $t2$, a current $q$ flows through diode D1 and through the primary coil of transformer T$r$2. This current then proceeds over coil D$r$1, points P3 and P4 and over diode D1. During the conducting phase, which in FIG. 7 begins at instant $t2$ and continues through $t3$, the current $q$ flows, beginning from rectifier G, over transistor T1, over the secondary of transformer T$r$2, reactance coil D$r$1, and over the circuit points P3 and P4.

The currents flowing during this conducting phase, and during the blocking phase through the primary of transformer T$r$2 are enduced into the secondary of this transformer, and these enduced currents are rectified using diodes D8 and D9. A negative voltage is generated at the junction point between diode D8 and resistor R22, and a positive voltage is generated at the junction point between resistor R23 and capacitor C8. This negative or positive voltage is applied at the voltage divider formed by the resistors R22 and R23. The voltage applied at the tap of the divider acts upon the emitter (see FIG. 5) of transistor T17 over resistor R9. The transistor T17 becomes conductive when the voltage across resistor R23 reaches the threshold voltage of transistor T17. If the current $q$ is greater than the predetermined rated value, then the voltage tapped at the resistor R12 is greater than the threshold voltage. At this point, transistor T17 becomes conductive, and the transistors T12 and T13 are blocked. Thus, the inhibiting phase ($t1 - t2$) is prolonged and the voltage applied at resistance RL is reduced.

Figure 4:
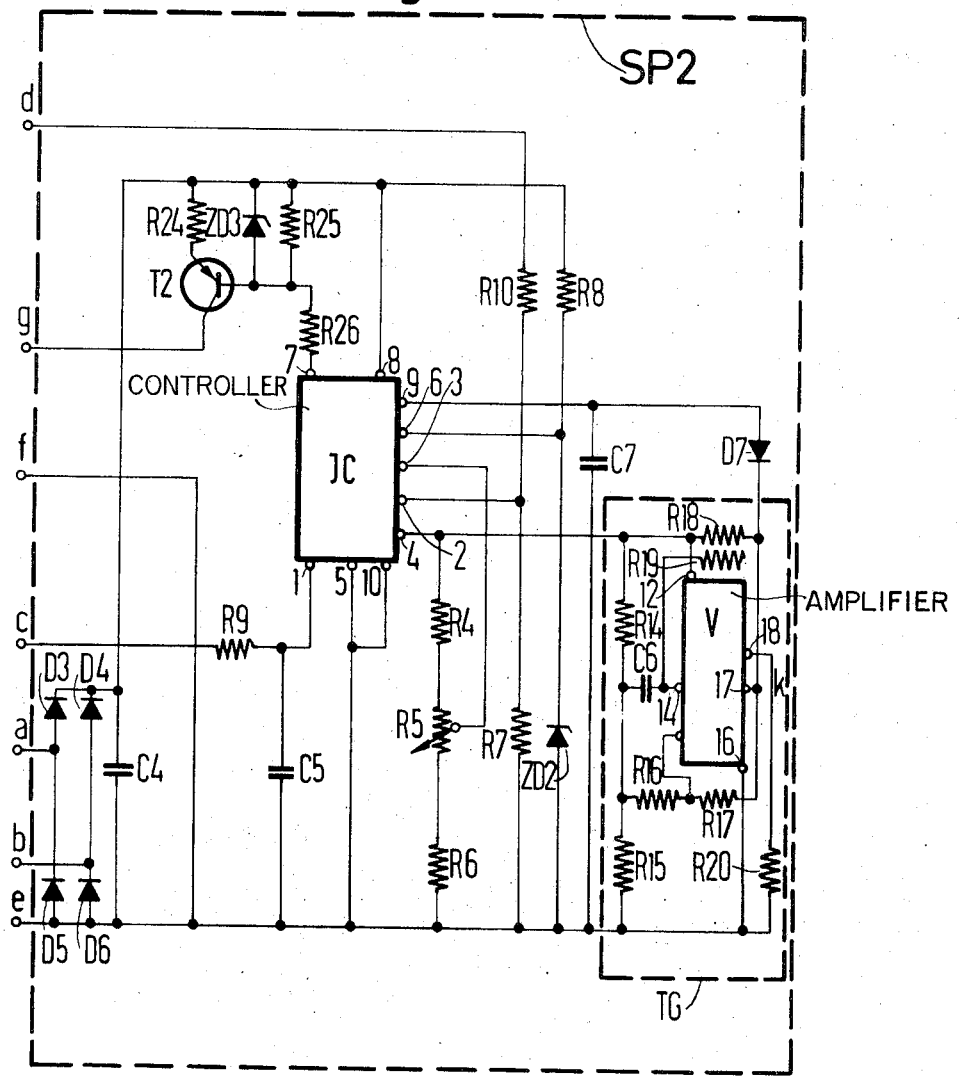
FIG. 4 is a more detailed schematic view of a portion of the FIG. 3 embodiment.

FIG. 4 shows the control circuit SP2 in greater detail. Aside from the above components, this figure shows the transistor T2, the Zener diode ZD3 and the resistors R24, R25, R26, which are connected in the illustrated manner.

Figure 5:
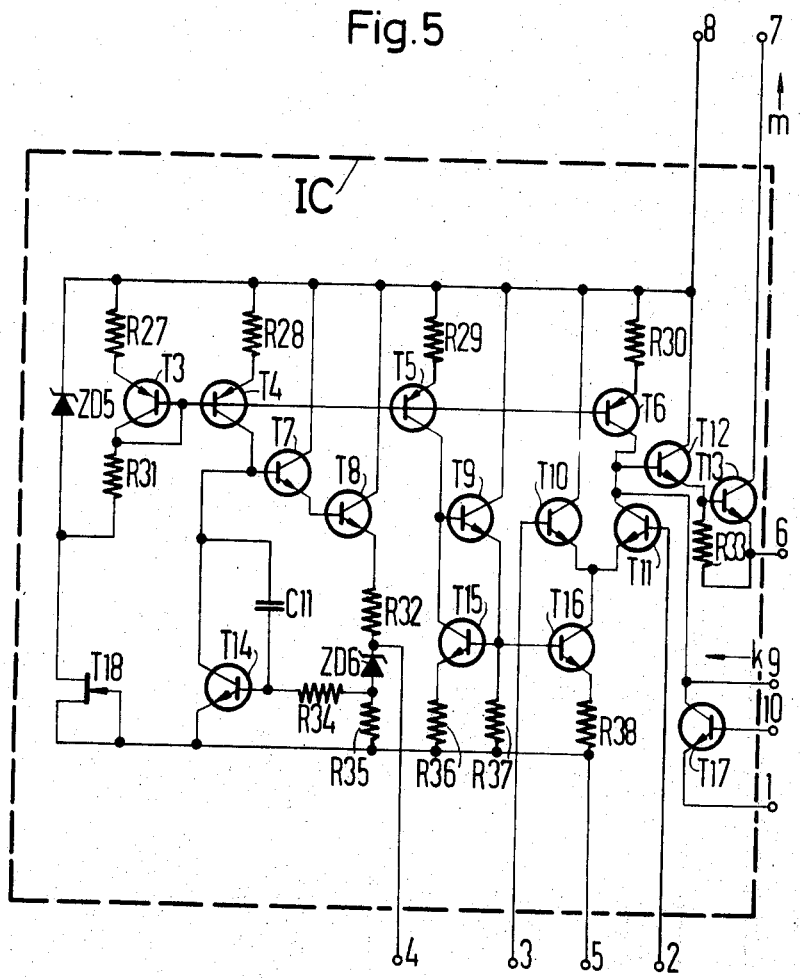
FIG. 5 is a schematic diagram of an integrated voltage controller used in the two circuit arrangements in accordance with FIGS. 1 and 3.

FIG. 5 depicts in greater detail the integrated controller JC illustrated in FIGS. 2 and 4 as a block diagram. The integrated controller IC comprises the resistors R27, R28, R29, R30, R31, R32, R33, R34, R35, R36, R37, R38, further the transistors T3, T4, T5, T6, T7, T8, t9, T10, T9, T12, T13, T14, T15, T16, T17, the field effect transistor T18, capacitor C11, and the Zener diodes ZD5, ZD6.

Figure 6:
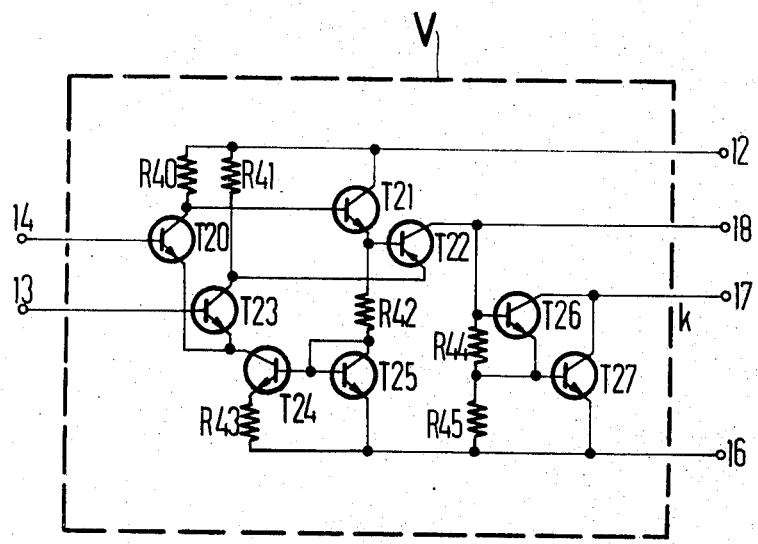
FIG. 6 shows in greater detail an integrated amplifier used in the two circuit arrangements in accordance with FIGS. 1 and 3, and FIG. 7 are pulse diagrams with reference to which the operations of the circuit arrangements in FIGS. 1 and 3 are explained.

FIG. 6 shows in greater detail an exemplary construction of the amplifier V, which is a component of the control circuits illustrated in FIGS. 2 and 4. This amplifier comprises the transistors T20, T21, T22, T23, T24, T25, T26, T27, and the resistors R40, R41, R42, R43, R44, R45. These components are connected as shown in this figure and operate in the conventional manner. This amplifier V is of known construction and can be obtained as an integrated component.

FIG. 7 using time-voltage amplitude diagrams shows some signals, with reference to which the manner of operation of the circuit arrangements in accordance with FIGS. 1 to 6 is explained. The time $t$ is plotted in the direction of abscissas.

The signal $k$ refers to the time slope of the voltage at the point 17 shown in FIGS. 2, 4 and 6. Signal $k$ serves as a timing signal and is generated by means of the frequency generator TG. It has a pulse repetition frequency of about 20 kHz and is coupled to the terminal 9 of the integrated controller IC through the diode D7 shown in FIGS. 2 and 4. It is apparent from FIG. 5 that the signal k is applied to the base of the transistor T12 through terminal 9, the emitter of transistor T12 being connected to the base of the transistor T13. In this way, the leading edge $m1$ of the voltage m $m$ generated across the collector of the transistor T13 and is coupled to the terminal 7 of the integrated controller IC.

The emitter-collector junction of the transistor T13 shown in FIG. 5 acts like an adjustable resistor which is connected on the one side to the terminal 7, shown in FIG. 2, through the resistor R3, the line $g$, through the primary winding of the transformer T$r$1, shown in FIG. 1, and over the line $f$ to the positive terminal of an operating voltage source made up of the diodes D3, D4, D5, D6 and of the capacitor C4. The emitter-collector junction of the transistor T13 is, as well, connected to the negative terminal of the operating voltage source to the terminal 6 and through the Zener diode ZD2 shown in FIG. 2.

As shown in FIG. 7, at the instant $t1$, the edge $n1$ of the signal $n$ is produced with the edge $m1$; signal $n$ represents the current through the primary winding of the transformer T$r$1. Furthermore, at the instant $t1$, the edge $p1$ of the signal $p$ is triggered with the edge $n1$; signal $p$ is the voltage across the base-emitter junction of the transistor T1 shown in FIG. 1.

Thus, from the instant $t1$ onwards, the transistor T1 is blocked, and at this time, the blocking phase is initiated. During this blocking phase, the current stored in the retardation coil D$r$1, flows through the load resistor RL and through the resistor R1 and the Diode D1. In the process, the voltage $q$ is generated across the load resistor RL and over the terminals P3/P4 or P7/P8, as the case may be.

By means of the transformer tr1, the transistor T1 receives a defined blocking voltage during the period from t1 to t2, so that the illustrated circuit arrangement is to a large extent insensitive to temperature.

The voltage q is tapped at the terminal points P7 and P8 and applied to control circuit SP1 and to the voltage divider therein shown in FIG. 2, made up of the two resistors R7 and R10. The tap of this voltage divider is connected to the integrated controller IC over the terminal 2. If the voltage at the terminal 2 drops below a certain value, the transistor T13 is controlled through the transistors T11 and T12 in a manner such that the edge m2 of the signal m is generated, thereby triggering in further succession the edges n2 and p2. The blocking phase thus terminates at the instant t2 while the blocking phase is started by the edge k1 of the timing signal at the instant t1, the edge of the blocking phase is dependent upon the voltage applied to the switching terminals P7 and P8 and thus, to the load resistor RL.

The comparison of the voltage tapped from the voltage terminals P7 and P8 with a reference voltage is carried out by means of the differential amplifier made up of the transistors T10 and T11 shown in FIG. 5.

At the instant t3, the next blocking phase is initiated with the next edge k2 of the timing signal k. The conducting phase of operation of the transistor T1, shown in FIG. 1, thus starts at the instant t2 and terminates at the instant t3. During this time, the current of the rectifier G flows through the emitter-collector junction of the transmitter T1, through the retardation coil Dr1 and through the load resistor RL back to the rectifier G. Thus, the voltage q is generated across the load resistor RL. Starting from the instant t2, the voltage applied to the load resistor RL and to the terminal points P7 and P8 increases.

If the voltage applied to the load resistor RL at the terminal points P3 and P4 reaches the level q1, then the transistor T1 shown in FIG. 1 is rendered conductive prior to the instant t2. This condition is shown by the dashed line of the signal q. In this manner, a reduction of the voltage applied to the load resistor RL is counteracted by shortening the blocking phase and by lengthening the conducting phase.

The connection point P5 shown in FIG. 1 is connected to the terminal 1 of the integrated controller through the line c and through the resistor R9 shown in FIG. 2. If the voltage applied to the terminal points P5 and P6 exceeds a given value, the voltage applied to the terminals 1 and 10 shown in FIG. 5 is, likewise, altered, so that the emitter-collector junction of the transistor T17 is rendered conductive. In further succession, the emitter-collector junction 1 of the transistor T13 is blocked, so that in further succession the emitter-collector junction of the transistor T1 is, likewise, blocked, thus affording overload protection.

The circuit arrangement in accordance with FIG. 3 is suited for load currents above 1.5 Amperes. In this case, it is convenient to provide overload protection by means of the transformer tr2 and the diodes D8, D9, the resistors R21, R22, R23, and the capacitor C8.

In this case, a voltage is tapped at the resistor R23, which is applied to the terminal point 1 through the resistor 9 via the lines c and e and to the terminal point 10 of the integrated controller IC. Thus, if a voltage applied to the resistor R23 is exceeded, the voltage applied to the terminal points 1 and 10 is again increased, so that the transistor T17 shown in FIG. 5 is rendered conductive and the transistor T13 is blocked. In this way, the emitter-collector junction of the transistor T1 shown in FIG. 3 is likewise blocked upon the occurrence of an overload.

The embodiments described hereinabove, including any described components or voltage and current values, are only intended to be exemplary of the principles of the invention and are not to be considered as defining the scope of the invention. The described embodiments may be modified or changed in many respects, while remaining within the scope of the invention as defined by the appended claims.

We claim:

1. Apparatus for regulating a direct current voltage appearing across a load impedance, comprising:
   a direct current voltage source,
   transistor switch means having a conducting path with a terminal on either end thereof and a control electrode which is responsive to predetermined voltages applied thereto for opening and closing said conducting path, one terminal of said conducting path being in series with said direct current source and the other terminal being in series with said load impedance,
   a series combination of a diode and resistor, said series combination being connected in series with said conducting path of said transistor switch and this combination being connected in series with said D.C. voltage source,
   first transformer means having primary and secondary windings, the voltage appearing across said secondary winding being coupled to said control electrode of said transistor switch,
   an operating voltage source,
   control circuit means including adjustable impedance means having a conducting path of adjustable impedance which connects said operating voltage source in series with said primary winding, a reference voltage source, means for comparing the output of said reference voltage source with the voltage appearing said load impedance, and in dependence on the compared result, for controlling the period of conduction of said adjustable impedance means, and timing generator means for producing an output signal for controlling the period of conduction of said adjustable impedance means in conjunction with said compared result, said timing generator means being coupled to said adjustable impedance means and
   means coupling the junction between said diode and resistor of said series combination to a control electrode of said adjustable impedance means.

2. The apparatus defined in claim 1 wherein said control circuit includes a differential amplifier for carrying out said comparison having an input connected to said reference voltage source and another input connected to receive the voltage appearing across said load impedance, said differential amplifier having an output coupled to the control electrode of said adjustable impedance means.

3. The apparatus defined in claim 1 further comprising:
   second transformer means having primary and secondary windings, said primary winding being in series with the conduction path of said transistor switch, said load impedance being connected in series with a tap on said primary winding, said secondary winding of said second transformer coupling the voltage appearing across the primary winding thereof to said control electrode of said adjustable impedance means as to render the latter non-conductive when the current flow through said second transformer primary winding exceeds a predetermined value.

* * * * *